(12) United States Patent
Wu

(10) Patent No.: US 7,949,937 B2
(45) Date of Patent: May 24, 2011

(54) APPARATUS AND METHOD FOR DELIVERING PORTIONS OF REPORTS

(75) Inventor: Ju Wu, Coquitlam (CA)

(73) Assignee: Business Objects Software Ltd, Dublin (IE)

(*) Notice: Subject to any disclaimer, the term of this patent is extended or adjusted under 35 U.S.C. 154(b) by 584 days.

(21) Appl. No.: 10/335,079

(22) Filed: Dec. 31, 2002

(65) Prior Publication Data

US 2007/0130517 A1    Jun. 7, 2007

(51) Int. Cl.
*G06F 17/00* (2006.01)

(52) U.S. Cl. ........ 715/209; 715/215; 715/234; 715/255; 715/851

(58) Field of Classification Search ............... 715/500, 715/200, 210, 221, 234, 273, 762, 209, 212, 715/215, 226, 229, 231, 253, 255, 256, 738, 715/739, 740, 764, 849, 850, 851, 853, 854, 715/513, 526; 707/2, 4, 101; 709/203, 217, 709/223, 227
See application file for complete search history.

(56) References Cited

U.S. PATENT DOCUMENTS

| | | | |
|---|---|---|---|
| 5,132,899 A | 7/1992 | Fox | |
| 5,257,185 A * | 10/1993 | Farley et al. | 707/100 |
| 5,555,403 A * | 9/1996 | Cambot et al. | 707/4 |
| 5,606,609 A | 2/1997 | Houser et al. | |
| 5,630,122 A | 5/1997 | Kaplan et al. | |
| 5,634,122 A | 5/1997 | Loucks et al. | |
| 5,664,182 A | 9/1997 | Nierenberg et al. | |
| 5,710,900 A * | 1/1998 | Anand et al. | 715/764 |
| 5,787,416 A * | 7/1998 | Tabb et al. | 707/2 |
| 5,801,702 A * | 9/1998 | Dolan et al. | 715/854 |
| 5,832,504 A * | 11/1998 | Tripathi et al. | 715/526 |
| 5,844,572 A * | 12/1998 | Schott | 345/440 |
| 5,978,818 A * | 11/1999 | Lin | 715/501.1 |
| 6,073,129 A | 6/2000 | Levine et al. | |
| 6,081,810 A * | 6/2000 | Rosenzweig et al. | 707/104.1 |
| 6,088,718 A | 7/2000 | Altschuler et al. | |
| 6,098,081 A | 8/2000 | Heidorn et al. | |
| 6,108,636 A | 8/2000 | Yap et al. | |
| 6,154,766 A | 11/2000 | Yost et al. | |
| 6,160,549 A * | 12/2000 | Touma et al. | 715/762 |
| 6,185,560 B1 | 2/2001 | Young et al. | |
| 6,212,524 B1 | 4/2001 | Weissman et al. | |
| 6,222,540 B1 * | 4/2001 | Sacerdoti | 345/581 |

(Continued)

FOREIGN PATENT DOCUMENTS

CA    2151654    * 12/1996

(Continued)

OTHER PUBLICATIONS

"Diagra Graphics Server" ReportLab Europe Ltd., retrieved from the Internet at http://www.reportlab.com/docs/diagra-ds.pdf>, document dated Aug. 2001, pp. 1-7.*

(Continued)

*Primary Examiner* — Maikhanh Nguyen
(74) *Attorney, Agent, or Firm* — Cooley LLP

(57) ABSTRACT

A computer-readable medium includes a report parts viewer. The report parts viewer is configured to identify a first report object of a first plurality of report objects included in a first report. The report parts viewer is configured to facilitate display of the first report object absent each remaining report object included in the first report.

16 Claims, 7 Drawing Sheets

U.S. PATENT DOCUMENTS

| | | | |
|---|---|---|---|
| 6,247,008 B1* | 6/2001 | Cambot et al. | 707/3 |
| 6,360,246 B1* | 3/2002 | Begley et al. | 709/203 |
| 6,377,956 B1 | 4/2002 | Hsu et al. | |
| 6,397,207 B1* | 5/2002 | Bleizeffer et al. | 707/2 |
| 6,442,714 B1* | 8/2002 | Griffin et al. | 714/46 |
| 6,460,058 B2 | 10/2002 | Koppolu et al. | |
| 6,477,529 B1 | 11/2002 | Mousseau et al. | |
| 6,519,571 B1 | 2/2003 | Guheen et al. | |
| 6,529,217 B1* | 3/2003 | Maguire et al. | 715/769 |
| 6,549,906 B1 | 4/2003 | Austin et al. | |
| 6,569,205 B1* | 5/2003 | Poggi | 715/202 |
| 6,578,027 B2* | 6/2003 | Cambot et al. | 707/2 |
| 6,581,068 B1* | 6/2003 | Bensoussan et al. | 707/104.1 |
| 6,643,635 B2* | 11/2003 | Nwabueze | 707/2 |
| 6,647,392 B1* | 11/2003 | Tagg | 707/101 |
| 6,654,770 B2* | 11/2003 | Kaufman | 707/200 |
| 6,668,253 B1* | 12/2003 | Thompson et al. | 707/999.01 |
| 6,768,994 B1* | 7/2004 | Howard et al. | 707/10 |
| 6,775,675 B1 | 8/2004 | Nwabueze et al. | |
| 6,801,910 B1* | 10/2004 | Bedell et al. | 707/999.006 |
| 6,826,597 B1 | 11/2004 | Lonnroth et al. | |
| 6,831,668 B2* | 12/2004 | Cras et al. | 715/853 |
| 6,889,210 B1 | 5/2005 | Vainstein | |
| 6,906,717 B2* | 6/2005 | Couckuyt et al. | 345/440 |
| 6,915,289 B1* | 7/2005 | Malloy et al. | 707/2 |
| 6,917,937 B1 | 7/2005 | Rubendall | |
| 6,993,533 B1* | 1/2006 | Barnes | 707/102 |
| 6,995,768 B2* | 2/2006 | Jou et al. | 345/440 |
| 7,003,506 B1 | 2/2006 | Fisk et al. | |
| 7,015,911 B2 | 3/2006 | Shaughnessy et al. | |
| 7,093,194 B2* | 8/2006 | Nelson | 715/234 |
| 7,155,439 B2 | 12/2006 | Cope | |
| 7,170,519 B2* | 1/2007 | Patel et al. | 345/440 |
| 7,243,106 B2* | 7/2007 | Vierich et al. | 707/999.102 |
| 7,310,687 B2 | 12/2007 | Psounis et al. | |
| 2001/0042080 A1 | 11/2001 | Ross | |
| 2002/0035501 A1 | 3/2002 | Handel et al. | |
| 2002/0042687 A1 | 4/2002 | Tracy et al. | |
| 2002/0052954 A1* | 5/2002 | Polizzi et al. | 709/225 |
| 2002/0091681 A1* | 7/2002 | Cras et al. | 707/3 |
| 2002/0140699 A1* | 10/2002 | Miyadai | 345/440 |
| 2003/0004272 A1 | 1/2003 | Power | |
| 2003/0023476 A1 | 1/2003 | Gainey | |
| 2003/0028451 A1 | 2/2003 | Ananian | |
| 2003/0046264 A1* | 3/2003 | Kauffman | 707/1 |
| 2003/0050919 A1 | 3/2003 | Brown et al. | |
| 2003/0050927 A1* | 3/2003 | Hussam | 707/5 |
| 2003/0074456 A1 | 4/2003 | Yeung et al. | |
| 2003/0101201 A1 | 5/2003 | Saylor et al. | |
| 2003/0106016 A1 | 6/2003 | Kendrick et al. | |
| 2003/0115207 A1* | 6/2003 | Bowman et al. | 707/100 |
| 2003/0151621 A1 | 8/2003 | McEvilly et al. | |
| 2003/0196121 A1 | 10/2003 | Raley et al. | |
| 2003/0208460 A1* | 11/2003 | Srikant et al. | 707/1 |
| 2003/0225747 A1 | 12/2003 | Brown et al. | |
| 2004/0024763 A1* | 2/2004 | Anderson | 707/9 |
| 2004/0034615 A1* | 2/2004 | Thomson et al. | 707/1 |
| 2004/0078593 A1 | 4/2004 | Hind et al. | |
| 2004/0117731 A1* | 6/2004 | Blyashov | 715/507 |
| 2004/0122730 A1 | 6/2004 | Tucciarone et al. | |
| 2004/0153649 A1 | 8/2004 | Rhoads et al. | |
| 2004/0153969 A1 | 8/2004 | Rhodes | |
| 2005/0091581 A1 | 4/2005 | Bezrukov et al. | |
| 2005/0165815 A1 | 7/2005 | Ozzie et al. | |
| 2005/0169496 A1 | 8/2005 | Perry | |
| 2005/0262047 A1 | 11/2005 | Wu et al. | |
| 2006/0010060 A1 | 1/2006 | Jones et al. | |
| 2006/0041589 A1 | 2/2006 | Helfman et al. | |
| 2006/0271508 A1 | 11/2006 | Wu et al. | |
| 2006/0277531 A1 | 12/2006 | Horwitz et al. | |
| 2007/0073690 A1 | 3/2007 | Boal et al. | |
| 2007/0198918 A1 | 8/2007 | Mor | |
| 2007/0214112 A1 | 9/2007 | Towers et al. | |

FOREIGN PATENT DOCUMENTS

| | | | |
|---|---|---|---|
| EP | 1014283 A1 * | 6/2000 | |
| EP | 1304630 A2 | 4/2003 | |

OTHER PUBLICATIONS

"Utilizing OLE in Office XP/2000" Create for Mississippi, retrieved from the Internet at http://www.create.cett.msstate.edu/create/howto/ole.pdf>, document dated Aug. 2001, pp. 1-7.*

"eReport Option" Actuate Corporation, retrieved from the Internet at http://www.actuate.com/download/A8ereportoption.pdf>, document dated 2002, pp. 1-7.*

Business Objects, "InfoView User's Guide," Business Object 2000, Microsoft Corporation, Editions: 2, XP-001152181, pp. I-XVI, pp. 18-28 and 259-296.*

Brio Technology, "Secure Business Intelligence with Brio Enterprise," Brio Technology, Inc., Palo Alto, CA, Nov. 1998, XP-001152182, pp. 1-20.*

Seagate Crytal Reports Version 8 User's Guide, Seagate Software, 1999, pp. 22, 31-32, 55, 79-82, 104-152, 189-191, 286-303, 306-309, 456-462, 472-484, 589-590, 607-621.*

Lucas et al., Special Edition Using Crytal Enterprise 8.5, Que Corporation, Jun. 2002, pp. 247-259.*

Product Brochure for "Business Objects" available from Business Objects, Incorporated, 1993.*

* cited by examiner

APPARATUS AND METHOD FOR DELIVERING PORTIONS OF REPORTS

BRIEF DESCRIPTION OF THE INVENTION

The present invention relates generally to delivering electronic reports. More particularly, the present invention relates to delivering specific portions of electronic reports.

BACKGROUND OF THE INVENTION

There are a number of commercially available products to produce reports from data stored in a database. For instance, Crystal Decisions, Inc. of Palo Alto, Calif., sells a number of widely used report generation products, including Crystal Reports™, Crystal Analysis™, and Crystal Enterprise™.

In many instances, reports are designed to have salient information as well as detailed information. Some users may wish to view a report in its entirety, while other users may wish to simply view the salient information included in the report. However, previous reporting approaches generally lack sufficient flexibility to deliver a specific portion of a report that may be of interest to a user. Rather, previous reporting approaches often delivered a report in its entirety or an entire page of the report at a time. Moreover, some users may wish to view specific portions of one or more reports. However, previous reporting approaches sometimes lack the ability to effectively link specific portions of one or more reports to provide a navigation path through the one or more reports.

Also, a report can include a number of elements such as, for example, a chart, a map, and the like. Certain devices such as cellular phones may not be able to properly display such a report. In accordance with previous reporting approaches, report designers often had to produce reports that were tailored for specific devices. Such approaches are time consuming and expensive, since multiple reports that contain similar information have to be produced.

It is against this background that a need arose to develop the apparatus and method described herein.

SUMMARY OF THE INVENTION

In one innovative aspect, the present invention relates to a computer-readable medium. In one embodiment, the computer-readable medium comprises a report parts viewer. The report parts viewer is configured to identify a first report object of a first plurality of report objects included in a first report. The report parts viewer is configured to facilitate display of the first report object absent each remaining report object included in the first report.

In another embodiment, the computer-readable medium comprises instructions to coordinate a navigation request for a first report object with a second report object. The first report object is included in a first report, and the second report object is included in one of the first report and a second report. The computer-readable medium also comprises instructions to produce a data context of the second report object in response to the navigation request. The computer-readable medium further comprises instructions to retrieve at least one instance of the second report object based on the data context of the second report object.

In another innovative aspect, the present invention relates to a method of processing reports. In one embodiment, the method comprises coordinating a request to view a first report with a first report object of a first plurality of report objects included in the first report. The method also comprises facilitating display of the first report object absent each remaining report object included in the first report.

Embodiments of the invention provide functionality to allow a specific portion of a report to be viewed without the rest of the report. In particular, embodiments of the invention allow flexibility in delivering a specific portion of a report that can be tailored for a particular user or for a particular computing device. Embodiments of the invention facilitate linking of various report objects to create a navigation path through one or more reports. Also, embodiments of the invention facilitate navigation to one or more instances of a report object by passing an appropriate data context to the report object.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION

Figure 1:
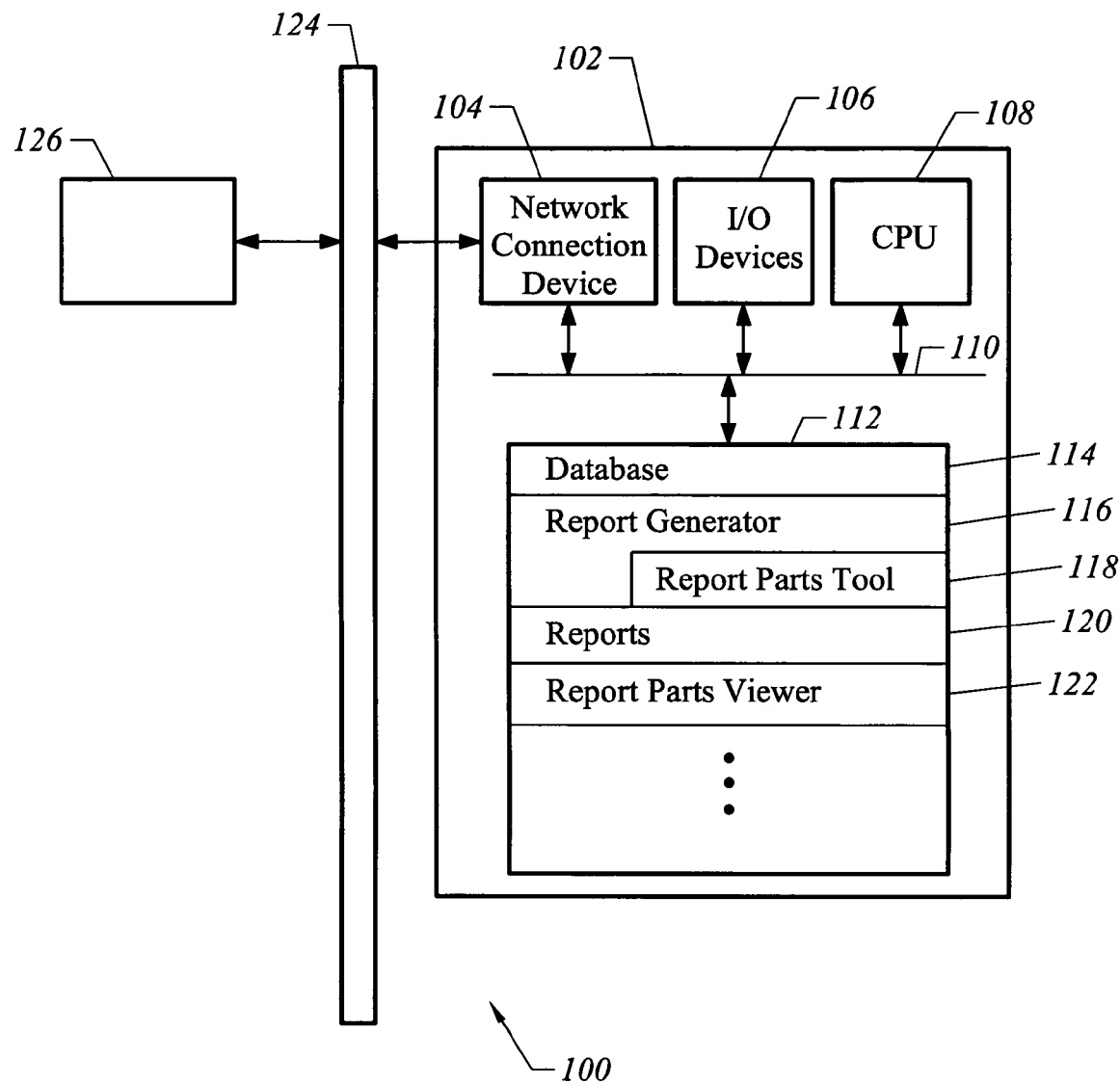
FIG. 1 illustrates a computer network that may be operated in accordance with an embodiment of the invention.

FIG. 1 illustrates a computer network 100 that may be operated in accordance with an embodiment of the invention. The computer network 100 includes a computer 102, which, in general, may be a client computer or a server computer. In the present embodiment of the invention, the computer 102 is a server computer including conventional server computer components. As shown in FIG. 1, the computer 102 includes a Central Processing Unit ("CPU") 108 that is connected to a network connection device 104 and a set of input/output devices 106 (e.g., a keyboard, a mouse, a video monitor, a printer, a speaker, and so forth) via a bus 110. The network connection device 104 is connected to a network transport medium 124, which may be any wired or wireless transport medium.

The CPU 108 is also connected to a memory 112 via the bus 110. The memory 112 stores a set of executable programs. One executable program is a report generator 116. The report generator 116 can utilize standard techniques to produce a set of reports 120. In particular, the report generator 116 can access a database 114 resident in the memory 112 to produce the set of reports 120. Each report of the set of reports 120 can include one or more report objects. A report object refers to a particular portion of a report. In some instances, a report object refers to a particular portion of a report that contains related information. A report object can correspond to, for example, a summary field, a detail field, a chart, a map, a bitmap, a crosstab, a text block, a group name, or a combination thereof.

Referring to FIG. 1, the report generator 116 includes a report parts tool 118. In contrast to previous approaches, the report parts tool 118 provides functionality to allow a specific portion of a report to be viewed without the rest of the report. In particular, the report parts tool 118 can configure one or more report objects to be displayed in the absence of the rest of a report. For instance, a report can be a sales report that includes a chart and various summary and detail fields. For certain applications, it may not be desirable or feasible to view the entire sales report or an entire page of the sales report. In the present example, the report parts tool 118 can configure the chart to be displayed without the rest of the sales report. As another example, the report parts tool 118 can configure a summary or a detail field to be displayed without the rest of the sales report. The report parts tool 118 allows flexibility in delivering a specific portion of a report that can be tailored for a particular user. In the present embodiment of the invention, the report parts tool 118 facilitates linking of a report object included in one report to other report objects included in the same report or in different reports. Linking of report objects can create a navigation path through one or more reports, such that specific report objects can be displayed along the navigation path.

In the present embodiment of the invention, the report parts tool 118 can operate in conjunction with a report parts viewer 122. Unlike conventional report viewers, the report parts viewer 122 allows a user to view a specific portion of a report without the rest of the report. In particular, the report parts viewer 122 facilitates display of a set of report objects configured using the report parts tool 118. As discussed previously, various report objects can be linked to create a navigation path, and the report parts viewer 122 can coordinate navigation requests from a user with specific report objects to be displayed along the navigation path. In the present embodiment of the invention, the report parts viewer 122 can be integrated with Internet applications and wireless applications. In particular, the report parts viewer 122 can facilitate display of a set of report objects in applications such as, for example, portals or digital dashboards.

The report parts viewer 122 may be executed to display a set of report objects using, for example, a video monitor included in the set of input/output devices 106. Alternatively, or in conjunction, the report parts viewer 122 may be executed to allow a set of report objects to be displayed on a computing device 126. The computing device 126 may be a client computer, including conventional client computer components, or a portable computing device, including conventional portable computing device components. Examples of portable computing devices include personal digital assistants ("PDAs") two-way pagers, and cellular phones. Unlike previous approaches, the report parts viewer 122 need not deliver data associated with an entire report or an entire page of the report to the computing device 126, which may not be able to properly process such data. Rather, the report parts viewer 122 can deliver data associated with a specific portion of the report to be displayed. The report parts viewer 122 can deliver different portions of a report to different types of computing devices, thereby avoiding the need to produce multiple reports for the different types of computing devices.

While the database 114, the report generator 116, the report parts tool 118, the set of reports 120, and the report parts viewer 122 are shown residing in the single computer 102, it should be recognized that such configuration is not required in all applications. For instance, one or more of these elements may reside in the computing device 126 or in a separate computer (not shown in FIG. 1) that is connected to the network transport medium 124.

Figure 2:
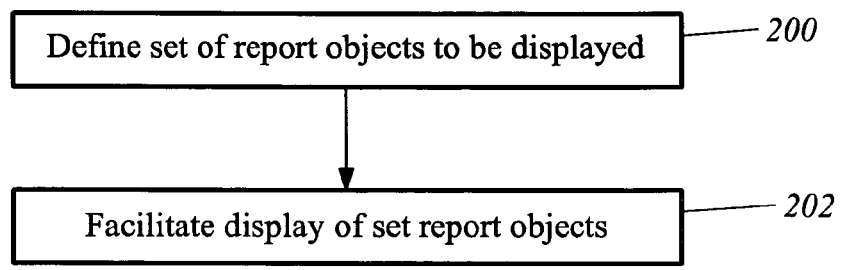
FIG. 2 illustrates processing operations associated with an embodiment of the invention.

FIG. 2 illustrates processing operations associated with an embodiment of the invention. Initially, a set of report objects to be displayed is defined (block 200). The set of report objects can be included in a single report or in multiple reports.

Figure 3:
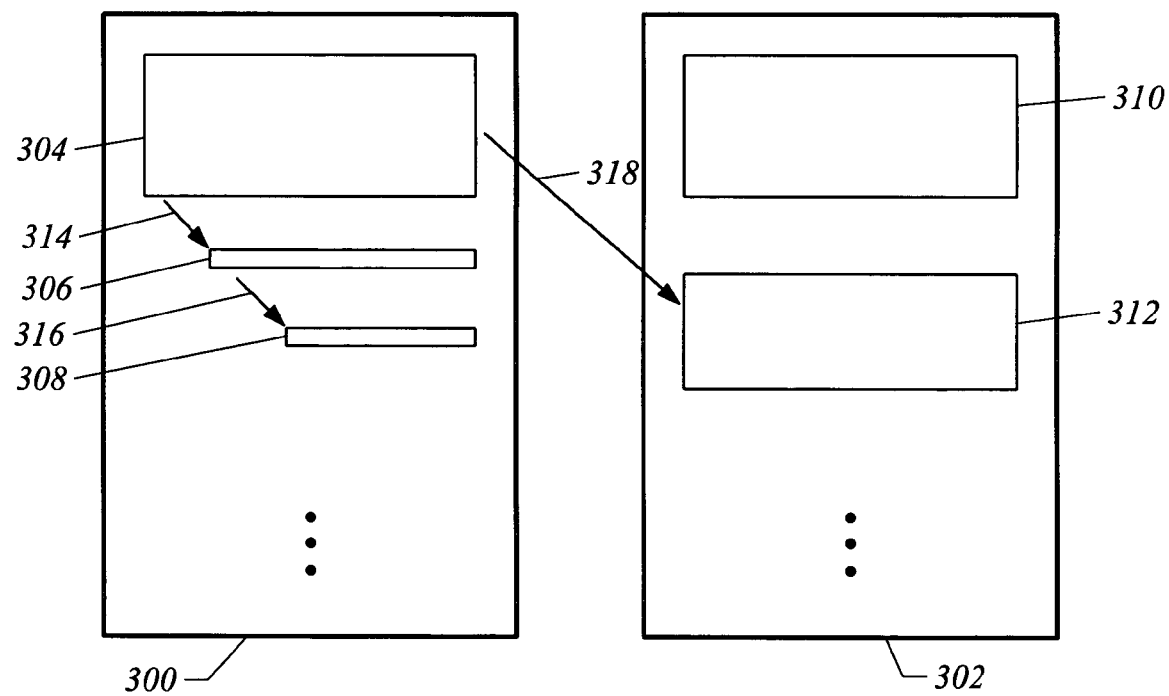
FIG. 3 illustrates two reports according to an embodiment of the invention.

By way of example, FIG. 3 illustrates two reports 300 and 302 according to an embodiment of the invention. Each report includes various report objects. In particular, the report 300 includes report objects 304, 306, and 308, and the report 302 includes report objects 310 and 312. Various report objects included in a report can be arranged in a hierarchy. For instance, the report object 304 can correspond to a chart showing total sales figures for various employees, the report object 306 can correspond to a summary field showing total sales figures for a particular employee, and the report object 306 can correspond to a detail field showing sales figures in a particular geographical region for a particular employee. For certain applications, multiple instances of a particular report object can be defined. For instance, multiple instances of the report object 306 can correspond to summary fields showing total sales figures for various employees, and multiple instances of the report object 308 can correspond to detail fields showing sales figures in various geographical regions for various employees.

A report object (e.g., the report object 306) included in a report can be associated with a set of report object parameters. Examples of report object parameters include:

1. Report Uniform Resource Identifier ("URI")—This parameter indicates the report that includes the report object;
2. Report Object Name—This parameter indicates a name of the report object; and
3. Data Context—This parameter indicates one or more instances of the report object.

A report parts tool (e.g., the report parts tool 118) can configure a first report object of a set of report objects included in a first report as an initial report object. In the example shown in FIG. 3, the report object 304 can be configured as an initial report object. In some instances, an initial report object can correspond to a report object that is initially displayed along a particular navigation path. For certain applications, the report parts tool can configure the first report object as an initial report object by creating an indication of the first report object as an initial report object. Such an indication can be created by specifying one or more report object parameters of the first report object and can be stored along with the first report as a property of the first report.

Figure 4:
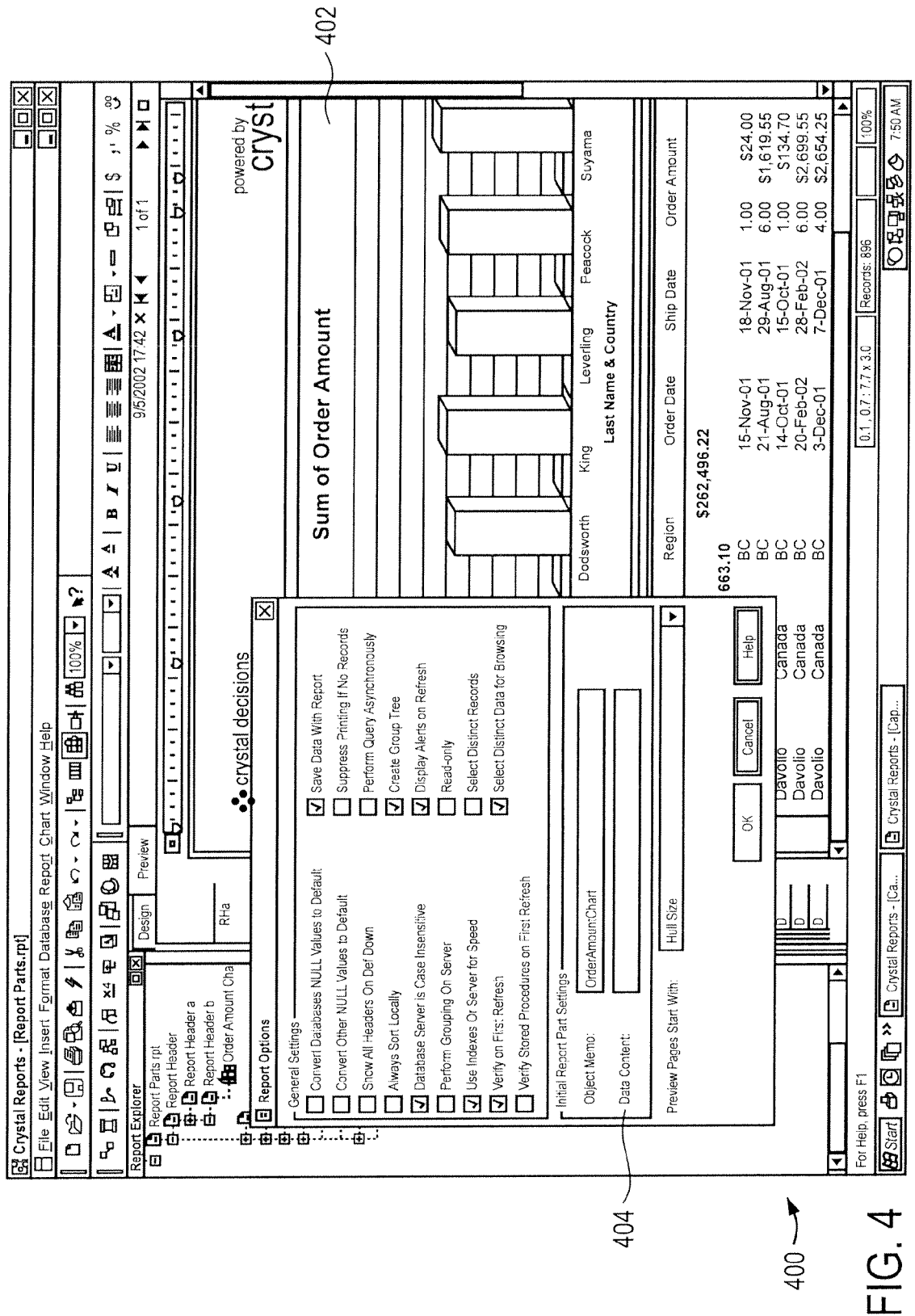
FIG. 4 illustrates an example of a user-interface screen that may be provided by a report parts tool according to an embodiment of the invention.

FIG. 4 illustrates an example of a user-interface screen 400 that may be provided by a report parts tool (e.g., the report parts tool 118) according to an embodiment of the invention. The user-interface screen 400 indicates various report objects included in a report. In this example, a report object 402 named as "OrderAmountChart" is selected. The user-interface screen 400 indicates a window 404 labeled as "Report Options", and one or more report object parameters of the report object 402 can be specified to configure the report object 402 as an initial report object.

A report parts tool (e.g., the report parts tool 118) can configure a second report object as a destination report object, which second report object can be associated with a first report object included in the same or a different report. A destination report object can correspond to a report object that is subsequently displayed along a particular navigation path. Multiple destination report objects can be configured, and the multiple destination report objects can be sequentially or simultaneously displayed along a particular navigation path. For certain applications, the report parts tool can configure a second report object as a destination report object by creating a navigation link between a first report object and the second report object. Such a navigation link can be created by specifying one or more report object parameters of the second report object and can be stored along with a report as a property of the report. In the example shown in FIG. 3, the report object 306 can be configured as a destination report object that is associated with the report object 304 via a navigation link 314. As discussed previously, various report objects included in the report 300 can be arranged in a hierarchy, and linking of report objects at different levels of the hierarchy (e.g., the report objects 304 and 306) allows for drill-down functionality. In a similar manner, the report parts tool facilitates linking of report objects included in different reports. With reference to FIG. 3, the report object 312 can be configured as a destination report object that is associated with the report object 304 via a navigation link 318.

Figure 5:
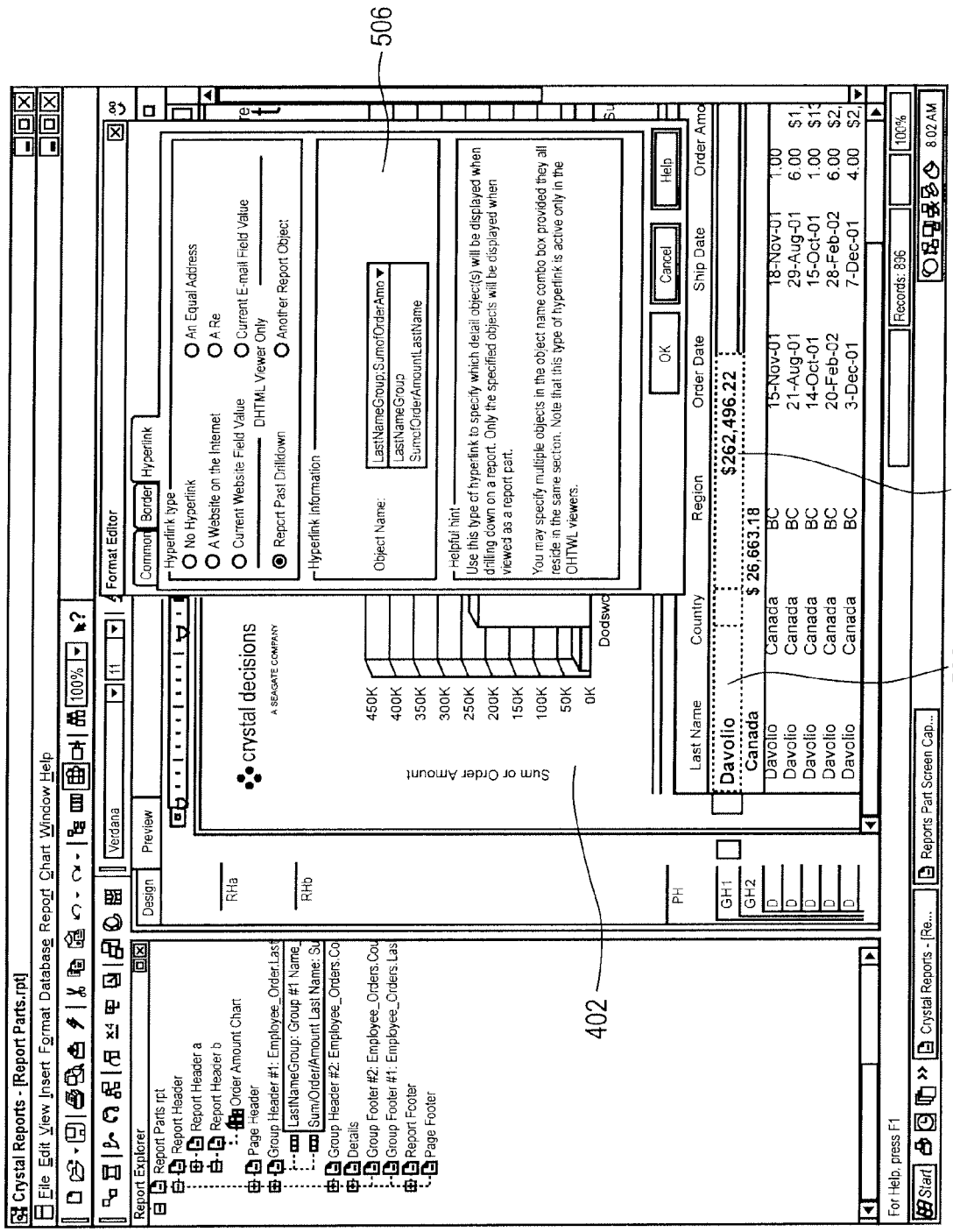
FIG. 5 illustrates another example of a user-interface screen that may be provided by a report parts tool according to an embodiment of the invention.

FIG. 5 illustrates another example of a user-interface screen 500 that may be provided by a report parts tool (e.g., the report parts tool 118) according to an embodiment of the invention. In this example, the report object 402 can be configured as an initial report object as discussed in connection with FIG. 4. Referring to FIG. 5, two report objects 502 and 504 named as "LastNameGroup" and "SumOrderAmountLastName" are selected. The user-interface screen 500 indicates a window 506 labeled as "Format Editor", and one or more report object parameters of the report objects 502 and 504 can be specified to configure the report objects 502 and 504 as destination report objects that are associated with the report object 402.

If desired, navigation functionality can be enhanced by further linking report objects. In the example shown in FIG. 3, the report object 308 can be configured as an additional destination report object that is associated with the report object 306 by creating a navigation link 316.

Returning to FIG. 2, the next processing operation is to facilitate the delivery and ultimate display of the set of report objects (block 202). A report parts viewer (e.g., the report parts viewer 122) can facilitate the delivery and display of the set of report objects. In the present embodiment of the invention, the report parts viewer can coordinate a request to view a first report with a first report object of a set of report objects included in the first report. In particular, in response to the request to view the first report, the report parts viewer can identify the first report object as an initial report object. Such identification can be based on, for example, an indication of the first report object as an initial report object. The report parts viewer can then facilitate display of the first report object absent each remaining report object included in the first report. For certain applications, the report parts viewer can deliver data associated with the first report object to a computing device (e.g., the computing device 126), which can display the first report object.

As discussed previously, various report objects can be linked to create a navigation path, and the report parts viewer can coordinate navigation requests with specific report objects to be displayed along the navigation path. For instance, the report parts viewer can coordinate a navigation request for the first report object with a second report object included in the same report. In particular, in response to the navigation request, the report parts viewer can identify the second report object as a destination report object. Such identification can be based on, for example, a navigation link between the first report object and the second report object. Multiple instances of the second report object can be defined, and the report parts viewer can facilitate navigation to one or more instances of the second report object by passing an appropriate data context to the second report object. The report parts viewer can then facilitate display of the second report object absent each remaining report object included in the first report. For certain applications, the report parts viewer can deliver data associated with the second report object to a computing device (e.g., the computing device 126), which can display the second report object.

Alternatively, or in conjunction, the report parts viewer can coordinate a navigation request for the first report object with a second report object of a set of report objects included in a second report. As discussed previously, the report parts viewer can facilitate navigation to one or more instances of the second report object by passing an appropriate data context to the second report object. The report parts viewer can then facilitate display of the second report object absent each remaining report object included in the second report.

Figure 6:
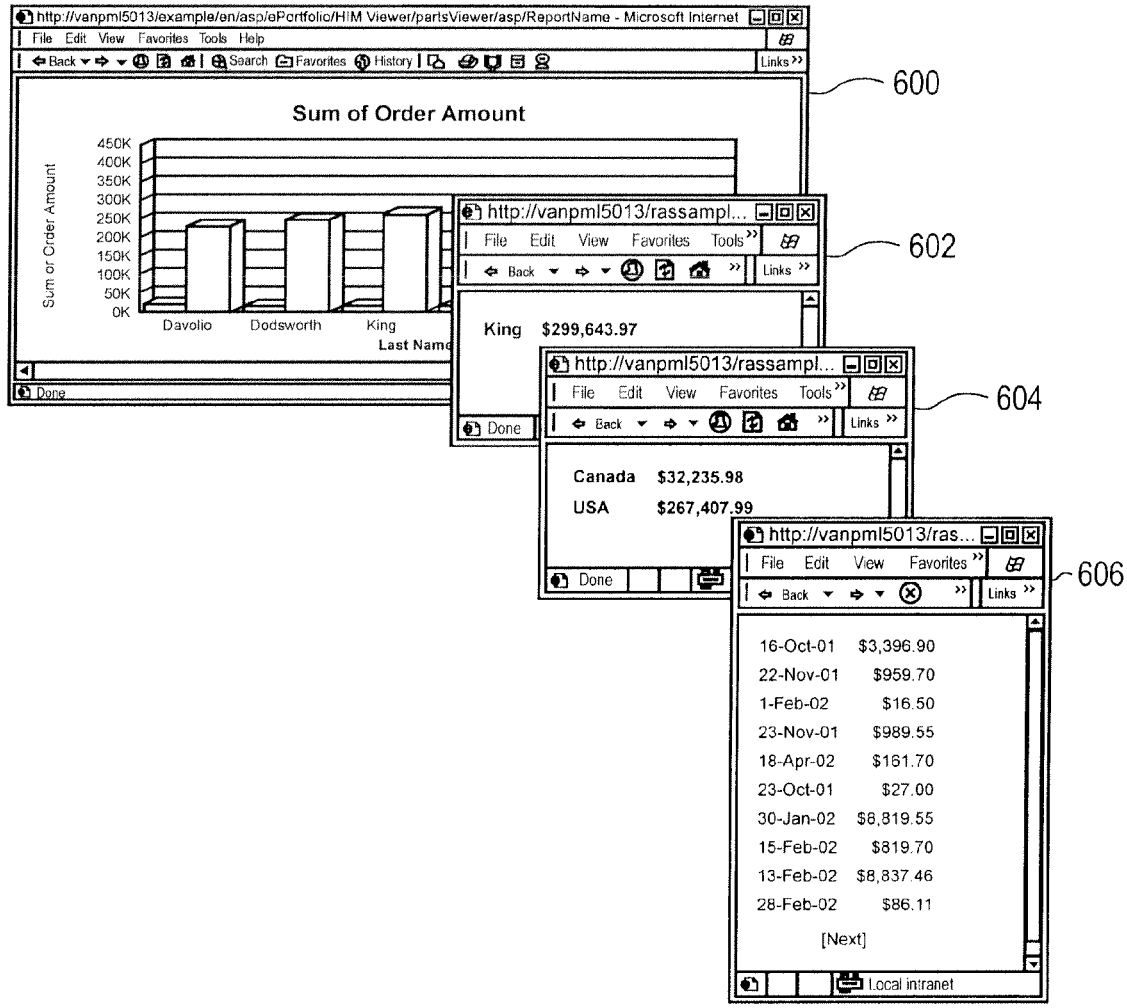
FIG. 6 illustrates a sequence of user-interface screens showing navigation functionality in accordance with an embodiment of the invention.

FIG. 6 illustrates a sequence of user-interface screens 600, 602, 604, and 606 in accordance with an embodiment of the invention. The sequence of user-interface screens 600, 602, 604, and 606 can be displayed on a computing device (e.g., the computing device 126) using a report parts viewer (e.g., the report parts viewer 122). As shown in FIG. 6, a set of report objects included in a report can be displayed along a particular navigation path. Here, the report objects can be arranged in a hierarchy, and the sequence of user-interface screens 600, 602, 604, and 606 provides an example of drill-down functionality.

Attention next turns to specific embodiments of the invention to further illustrate features and advantages of the invention. As discussed previously, a report object can be associated with a set of report object parameters, which can include a report URI, a report object name, and a data context.

A data context of a report object can indicate one or more hierarchy levels associated with a report and can define a region in the report in which one or more instances of the report object can be located. For certain applications, a data context of a report object can be specified using a format similar to Xpath (e.g., /USA or /USA/CA) or using a strongly-typed format (e.g., /Country[USA] or /Country[USA]/Region[CA]). A data context of a detail-level report object can be specified using a record number-based format (e.g., /Country[USA]/Region[CA]/RecordNumber[4]). All instances of a report object can be specified using a special character such as "*" (e.g., /Country[USA]/Region[*]). For certain applications, a data context of a report object can be specified using a formula-based format (e.g., "/"+{Table.Field} or "/"+{Table.Field}+"/"+{Table.Field}).

FIG. 7, FIG. 8, FIG. 9, and FIG. 10 illustrate implementations of navigation functionality according to various embodiments of the invention. In accordance with the navigation functionality as described herein, a first report object can be linked to a second report object. In response to a navigation request for the first report object, an appropriate data context can be produced, and the produced data context can be passed to the second report object to retrieve a relevant instance (or relevant instances) of the second report object.

Figure 7:
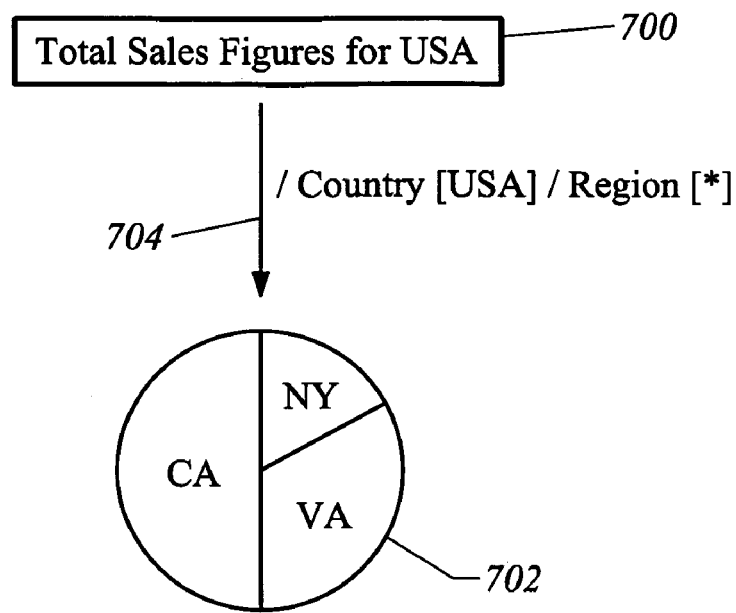
FIG. 7 illustrates an implementation of navigation functionality according to an embodiment of the invention.

Referring to FIG. 7, drill-down functionality is shown for report objects 700 and 702, which can be included in the same report. The report object 700 corresponds to a summary field showing total sales figures for a particular country (e.g., USA), and the report object 702 corresponds to a chart showing percentage contributions to total sales figures for various regions (e.g., CA, NY, and VA) within a particular country (e.g., USA). A report parts tool (e.g., the report parts tool 118) can be used to create a navigation link 704 between the report object 700 and the report object 702. In particular, the report object 702 can be configured as a destination report object (e.g., a drill-down report object) that is associated with the report object 700, and certain report object parameters (e.g., a report URI and a report object name) of the report object 702 can be associated with the report object 700 and stored as a property of the report.

When a user drills-down from the report object 700, a report parts viewer (e.g., the report parts viewer 122) can identify a data context of the report object 700 (e.g., /Country [USA]). The report parts viewer can produce a data context of the report object 702 (e.g., /Country[USA]/Region[*]) based on the data context of the report object 700. In particular, the report parts viewer can append "*" to the data context of the report object 700 to produce the data context of the report object 702. The report parts viewer can pass the produced data context to the report object 702 to retrieve a relevant instance (or relevant instances) of the report object 702. The report parts viewer can then facilitate display of the relevant instance (or relevant instances) of the report object 702.

In another scenario, the report parts viewer can identify a different data context of the report object 700 (e.g., /Country [Canada]). The report parts viewer can produce a data context of the report object 702 (e.g., /Country[Canada]/Region[*]) based on the different data context of the report object 700 and can pass the produced data context to the report object 702 to retrieve a relevant instance (or relevant instances) of the report object 702. For instance, instead of the chart shown in FIG. 7, the report parts viewer can facilitate display of a chart showing percentage contributions to total sales figures for various regions within Canada.

Figure 8:
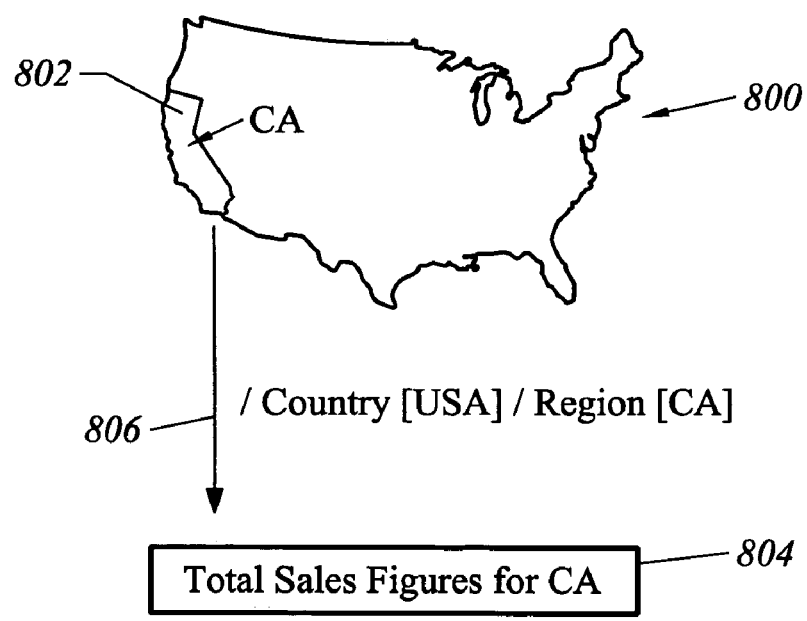
FIG. 8 illustrates an implementation of navigation functionality according to another embodiment of the invention.

FIG. 8 illustrates an implementation of drill-down functionality for report objects 800 and 804, which can be included in the same report. Here, the report object 800 corresponds to a map for a particular country (e.g., USA) that includes various target regions (e.g., a target region 802 corresponding to CA), and the report object 804 corresponds to a summary field showing total sales figures for a particular target region (e.g., the target region 802). A report parts tool (e.g., the report parts tool 118) can be used to create a navigation link 806 between the report object 800 and the report object 804. In particular, the report object 804 can be configured as a destination report object (e.g., a drill-down report object) that is associated with the report object 800, and certain report object parameters (e.g., a report URI and a report object name) of the report object 804 can be associated with the report object 800 and stored as a property of the report.

When a user drill-downs from the report object 800, a report parts viewer (e.g., the report parts viewer 122) can identify a data context of the report object 800 (e.g., /Country [USA]) and can produce a data context of the report object 804 (e.g., /Country[USA]/Region[CA]) based on the data context of the report object 800. In the present embodiment, the report parts viewer can identify the target region 802 based on coordinates (e.g., x and y offsets) of the target region 802 as specified by the user. Once the target region 802 is identified, the report parts viewer can append "CA" to the data context of the report object 800 to produce the data context of the report object 804. The report parts viewer can pass the produced data context to the report object 804 to retrieve a relevant instance (or relevant instances) of the report object 804. The report parts viewer can then facilitate display of the relevant instance (or relevant instances) of the report object 804.

In another scenario, the report parts viewer can identify a different target region (e.g., a target region corresponding to NY) specified by the user. The report parts viewer can produce a data context of the report object 804 (e.g., /Country [USA]/Region[NY]) based on the different target region and can pass the produced data context to the report object 804 to retrieve a relevant instance (or relevant instances) of the report object 804. For instance, instead of the summary field shown in FIG. 8, the report parts viewer can facilitate display of a summary field showing total sales figures for NY. In a similar manner as described above, drill-down functionality can be implemented for a report object corresponding to a chart (e.g., the report object 702) based on identifying a particular target region (e.g., a particular "slice") specified by a user.

Figure 9:
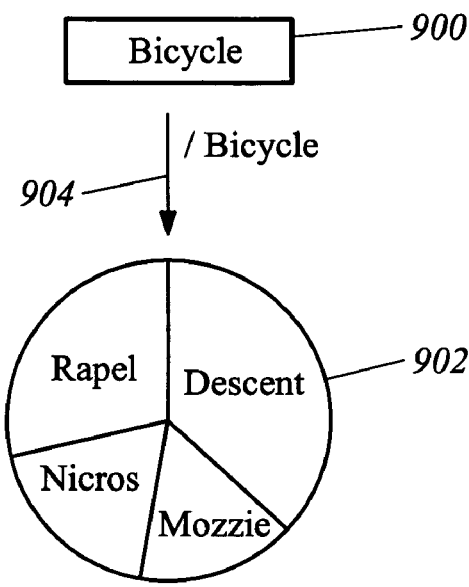
FIG. 9 illustrates an implementation of navigation functionality according to a further embodiment of the invention.

Turning next to FIG. 9, an implementation of navigation functionality is illustrated for report objects 900 and 902, which can be included in different reports. The report object 900 corresponds to a group name of a particular product class (e.g., Bicycle), and the report object 902 corresponds to a chart showing percentage contributions to total order amounts for various products (e.g., Descent, Mozzie, Nicros, and Rapel) within a particular product class (e.g., Bicycle). A report parts tool (e.g., the report parts tool 118) can be used to create a navigation link 904 between the report object 900 and the report object 902. In particular, the report object 902 can be configured as a destination report object that is associated with the report object 900, and certain report object parameters (e.g., a report URI and a report object name) of the report object 902 can be associated with the report object 900 and stored as a property of a report. In addition, a data context of the report object 902 can be specified when creating the navigation link 904. Desirably, the data context of the report object 902 can be specified using a formula-based format (e.g., "/"+{Table.Field} or "/"+{Table.Field}+"/"+{Table.Field}). In the present embodiment, the data context of the report object 902 can be specified as "/"+{Product.Product Class}.

When a user specifies a navigation request for the report object 900, a report parts viewer (e.g., the report parts viewer 122) can identify a data context of the report object 900 (e.g., /Bicycle). The report parts viewer can produce a data context of the report object 902 (e.g., /Bicycle) by applying "Bicycle" to the formula "/"+{Product.Product Class}. The report parts viewer can pass the produced data context to the report object 902 to retrieve a relevant instance (or relevant instances) of the report object 902. The report parts viewer can then facilitate display of the relevant instance (or relevant instances) of the report object 902.

In another scenario, the report parts viewer can identify a different data context of the report object 900 (e.g., /Accessory). The report parts viewer can produce a data context of the report object 902 (e.g., /Accessory) based on the different data context of the report object 900 and can pass the produced data context to the report object 902 to retrieve a relevant instance (or relevant instances) of the report object 902. For instance, instead of the chart shown in FIG. 9, the report parts viewer can facilitate display of a chart showing percentage contributions to total order amounts for various products within the Accessory product class.

Figure 10:
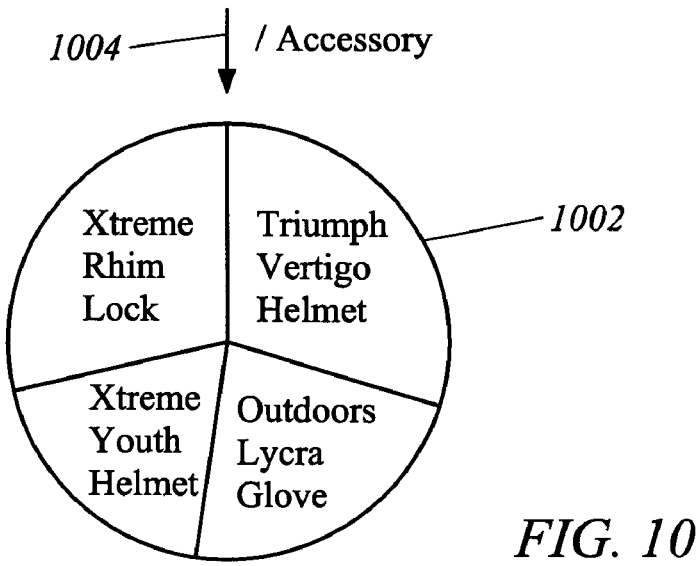
FIG. 10 illustrates an implementation of navigation functionality according to a yet further embodiment of the invention.

FIG. 10 illustrates an implementation of navigation functionality for report objects 1000 and 1002, which can be included in the same report or in different reports. The report object 1000 corresponds to a crosstab showing numbers of suppliers of various product classes (e.g., Accessory and Bicycle) in various countries (e.g., Canada, Japan, UK, and USA), and the report object 1002 corresponds to a chart showing percentage contributions to total order amounts for various products (e.g., Triumph Vertigo Helmet, Outdoors Lycra Glove, and so forth) within a particular product class (e.g., Accessory). A report parts tool (e.g., the report parts tool 118) can be used to create a navigation link 1004 between the report object 1000 and the report object 1002. In particular, the report object 1002 can be configured as a destination report object that is associated with the report object 1000, and certain report object parameters (e.g., a report URI and a report object name) of the report object 1002 can be associated with the report object 1000 and stored as a property of a report. In addition, a data context of the report object 1002 can be specified when creating the navigation link 1004. Desirably, the data context of the report object 1002 can be specified using a formula-based format (e.g., "/"+GridRowColumnValue ("Product.Product Class"), "/"+GridRowColumnValue ("Supplier.Country"), or "/"+GridRowColumnValue ("Product.Product Class")+"/"+GridRowColumnValue ("Supplier.Country")).

When a user specifies a navigation request for the report object 1000, a report parts viewer (e.g., the report parts viewer 122) can identify a particular region (e.g., a crosstab row, a crosstab column, or a crosstab cell) of the report object 1000 specified by the user. In particular, the report parts viewer can identify the particular region based on coordinates (e.g., a column value, a row value, or both) of the particular region as specified by the user. The report parts viewer can produce a data context of the report object 1002 by applying a column value, a row value, or both, to a formula specified for the data context of the report object 1002. For instance, the report parts viewer can apply the column value "Accessory" to the formula "/"+{Product.Product Class} to produce the data context of the report object 1002 (e.g., /Accessory). The report parts viewer can pass the produced data context to the report object 1002 to retrieve a relevant instance (or relevant instances) of the report object 1002. The report parts viewer can then facilitate display of the relevant instance (or relevant instances) of the report object 1002.

In another scenario, the report parts viewer can identify a different region (e.g., a region corresponding to the column value "Bicycle") of the report object 1000 specified by the user. The report parts viewer can produce a data context of the report object 1002 (e.g., /Bicycle) based on the different region and can pass the produced data context to the report object 1002 to retrieve a relevant instance (or relevant instances) of the report object 1002. For instance, instead of the chart shown in FIG. 10, the report parts viewer can facilitate display of a chart showing percentage contributions to total order amounts for various products within the Bicycle product class.

For some embodiments of the invention, implementation of navigation functionality supports firing of events (e.g., server-side events). In particular, before a navigation is carried out, a server-side event can be fired to allow another executable program to control or modify the navigation. For instance, in response to a navigation request, another executable program can acquire a particular data context and perform a database query based on the particular data context. As another example, a report object can be incorporated in a particular web page. When a navigation request is specified for the report object, an event handler code can be applied to route the navigation request to another web page that incorporates a report (e.g., an entire report) that includes the report object.

For certain applications, navigation functionality can be implemented to allow for "forward" and "backward" navigation to facilitate viewing of subsets of various report objects or subsets of various instances of a report object. Such "forward" and "backward" navigation can be implemented in a manner similar to bookmarks in a document. When navigating "forward", a report parts viewer (e.g., the report parts viewer 122) can configure a data context as a bookmark and can navigate to a data context of a next report object (or a next instance of a report object) in a hierarchy. Similarly, when navigating "backward", the report parts viewer can configure a data context as a bookmark and can navigate to a data context of a previous report object (or a previous instance of a report object) in the hierarchy.

Navigation functionality as described herein can be effectively applied to a variety of user scenarios, including the rapid development of report aggregations by facilitating linking and use of "child" reports as data sources. For instance, navigation functionality as described herein can be applied to streamline the creation of trending reports or to facilitate navigation to "detail" reports where detail data resides. In addition, navigation functionality as described herein can be applied in conjunction with conventional report viewers, such as conventional page viewers.

It should be recognized that the embodiments of the invention discussed above are merely exemplary, and various other embodiments are encompassed by the present invention.

For instance, in some embodiments of the invention, a report parts viewer can be incorporated in a web page using the following sequence of operations:

1. Create an ObjectFactory object;
2. Declare a path to a report that includes a report object to be displayed;
3. Create a function to output the report to the report parts viewer;
4. Create a CrystalReportPartsDefinition object using the ObjectFactory object and set report parts nodes to those of the CrystalReportPartsDefinition object;
5. Create CrystalReportPartNode objects using, the ObjectFactory Object and add CrystalReportPartNode objects to the report part nodes object; and
6. Create a report viewer object using the ObjectFactory object and set a report source and, optionally, other properties of the report parts viewer.

The following provides an example of an Active Server Page ("ASP") program that implements the sequence of operations:

```
<%@ Language=VBScript%>
<% Option Explicit
Response.ExpiresAbsolute = Now( ) – 1
' Create the ObjectFactory object.
Dim objFactory
Set objFactory = CreateObject("CrystalReports.ObjectFactory.2")
' Declare the path to the report which contains the Report Part to be displayed.
```

```
                const reportName = "C:\rasw\Product Catalog.rpt"
                Function OutputReport(fileName)
                        'Sets the report part definitions.
                        Dim def
                        Set def=
objFactory.CreateObject("CrystalReports.CrystalReportPartsDefinition")
                        Dim nodes
                        set nodes = def.ReportPartNodes
                        '''level 1 '''
                        Dim node1
                        Set node1 =
objFactory.CreateObject("CrystalReports.CrystalReportPartNode")
                        node 1.Name = "Category"
                        nodes.Add (node1)
                        '''level 2'''
                        Dim drillNodes
                        set drillNodes =
objFactory.CreateObject("CrystalReports.CrystalReportPartNodes")
                        Dim node2
                        Set node2 =
objFactory.CreateObject("CrystalReports.CrystalReportPartNode")
                        node2.Name = "ProductTypeName"
                        drillNodes.Add(node2)
                        node1.DrillDownPath = drillNodes 'Sets the drill-down path for node 1.
                        '''level 3'''
                        Dim drillNodes2
                        set drillNodes2 =
objFactory.CreateObject("CrystalReports.CrystalReportPartNodes")
                        Dim node4
                        Set node4 =
objFactory.CreateObject("CrystalReports.CrystalReportPartNode")
                        node4.Name = "ProductName"
                        drillNodes2.Add(node4)
                        Dim node5
                        Set node5
objFactory.CreateObject("CrystalReports.CrystalReportPartNode")
                        node5.Name = "UnitPrice"
                        drillNodes2.Add(node5)
                        node2.DrillDownPath = drillNodes2 'Sets the drill-down path for node 2.
                        '''level 4'''
                        Dim drillNodes3
                        set drillNodes3 =
objFactory.CreateObject("CrystalReports.CrystalReportPartNodes")
                        Dim node6
                        Set node6 =
objFactory.CreateObject("CrystalReports.CrystalReportPartNode")
                        node6.Name = "ProductID"
                        drillNodes3.Add(node6)
                        Dim node7
                        Set node7 =
objFactory.CreateObject("CrystalReports.CrystalReportPartNode")
                        node7.Name = "Size"
                        drillNodes3.Add(node7)
                        node4.DrillDownPath =drillNodes3 'Sets the drill-down path for node 4 and
node 5.
                        node5.DrillDownPath = drillNodes3
                        'Create a report parts viewer.
                        Dim HTMLPartsViewer
                        Set HTMLPartsViewer =
                        objFactory.CreateObject("CrystalReports.CrystalReportPartsViewer")
                        'Sets properties for the report parts viewer.
                        With HTMLPartsViewer
                                .ReportSource = fileName
                                .ReportParts = def
                                .Name = "partproductcat"
                                .IsOwnForm = true
                                .IsOwnPage = true
                                .HasBorder = false
                                .RecordNumber = 6
                                .IsDisplayHeadings = true
                        End With
                        'Displays the viewer and include error checking in case it fails.
                        On Error Resume Next
                        call HTMLpartsViewer.ProcessHttpRequest(Request, Response, Session)
                        if Err.number <>0 then
                                Response.Write Err.Description
                                Err.Clear
                        end if
                End Function
```

When the ASP program is executed, a report object can be displayed by calling an OutputReport function and passing it to a report path constant:

```
%>
<HEAD>
<TITLE> Report Parts Sample </TITLE>
</HEAD>
<% OutputReport reportName %>
```

As another example, an embodiment of the invention may include a help system, including a wizard that provides assistance to users, for configuring a computer network (e.g., the computer network 100) and its various components.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), ROM devices, and RAM devices. Examples of computer code include machine code, such as produced by a compiler, and files containing higher level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

While the present invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

What is claimed is:

1. A computer readable medium, comprising:
a report generator to produce, through an initial access to a database, a report with a set of report objects arranged in a hierarchy with each report object having an associated set of parameters; and
a report parts tool to deliver, in response to a report parts request, a first report object of the set of report objects without delivering the remaining report objects of the set of report objects, the report parts tool delivering the first report object from the report without a subsequent access to the database, wherein the report parts tool operates on a computer and delivers the first report object from the computer to a separate computing device;
wherein the report parts tool delivers a second report object of the set of report objects without delivering the remaining report objects of the set of report objects, the report parts tool delivering the second report object from the report without a subsequent access to the database, and
wherein the associated set of parameters includes a data context, and wherein the data context is passed from the first report object to the second report object.

2. The computer readable medium of claim 1 wherein the report objects include one or more of a summary field, a detail field, a chart, a map, a bitmap, a crosstab, a text block and a group name.

3. The computer readable medium of claim 1, wherein the set of parameters includes a report uniform resource identifier.

4. The computer readable medium of claim 1, wherein the set of parameters includes a report object name.

5. The computer readable medium of claim 1 further comprising executable instructions to create a navigation link between the first report object and the second report object.

6. The computer readable medium of claim 1 wherein the data context indicates hierarchical levels of report objects in the report.

7. A computer readable medium, comprising:
a report generator to produce, through an initial access to a database, a report with a set of report objects including at least four of a summary field, a detail field, a chart, a map, a bitmap, a crosstab, and a text block and a group name; and
a report parts tool to deliver, responsive to a report part request, a first report object of the set of report objects without delivering the remaining report objects of the set of report objects, the report parts tool delivering the first report object from the report without a subsequent access to the database, wherein the report parts tool operates on a computer and delivers the first report object from the computer to a separate computing device;
wherein the report parts tool delivers a second report object of the set of report objects without delivering the remaining report objects of the set of report objects, the report parts tool delivering the second report object from the report without a subsequent access to the database; and
wherein each report object has an associated set of parameters, wherein the set of parameters includes a data context, wherein the data context indicates hierarchy levels of the report.

8. The computer readable medium of claim 7, wherein the data context defines a region in the report where a report object is located.

9. The computer readable medium of claim 7 further comprising executable instructions to pass the data context from the first report object to the second report object.

10. The computer readable medium of claim 7 wherein the report objects are arranged in a hierarchy.

11. The computer readable medium of claim 7 wherein the set of parameters includes a report uniform resource identifier.

12. The computer readable medium of claim 7 wherein the set of parameters includes a report object name.

13. A computer readable medium, comprising executable instructions to:

produce a report with a set of report objects through an initial access to a database, wherein the set of report objects have a set of report object parameters;

configure a first report object of the set of report objects as an initial report object;

configure a second report object of the set of report objects as a destination report object;

responsive to an initial user request, deliver the initial report object without delivering the remaining report objects of the set of report objects, wherein the initial report object is delivered from the report without a subsequent access to the database; and responsive to a subsequent user request, deliver the destination report object without delivering the remaining report objects of the set of report objects, wherein the destination report object is delivered from the report without a subsequent access to the database, wherein the initial report object and the destination report object are formed on a computer and are delivered from the computer to a separate computing device;

wherein the report object parameters include a data context, wherein the data context defines a region in the report where a report object is located.

14. The computer readable medium of claim 13, wherein the data context indicates hierarchy levels of the report.

15. The computer readable medium of claim 13 wherein the report object parameters include a report uniform resource identifier.

16. The computer readable medium of claim 13 wherein the report object parameters include a report object name.

* * * * *